United States Patent
Kang et al.

(10) Patent No.: US 9,907,049 B2
(45) Date of Patent: Feb. 27, 2018

(54) METHOD AND APPARATUS FOR OPERATING IDLE MODE IN WIRELESS COMMUNICATION SYSTEMS

(71) Applicants: Samsung Electronics Co., Ltd., Suwon-si, Gyeonggi-do (KR); Korea Advanced Institute of Science and Technology, Daejeon (KR)

(72) Inventors: Hyun-Jeong Kang, Seoul (KR); Min-Hoe Kim, Daejeon (KR); Sung-Jin Park, Daejeon (KR); Byung-Chang Chung, Seoul (KR); Dong-Ho Cho, Seoul (KR)

(73) Assignees: Samsung Electronics Co., Ltd., Suwon-si, Gyeonggi-do (KR); Korea Advanced Institute of Science and Technology (KAIST), Daejeon (KR)

( * ) Notice: Subject to any disclaimer, the term of this patent is extended or adjusted under 35 U.S.C. 154(b) by 201 days.

(21) Appl. No.: 14/226,679

(22) Filed: Mar. 26, 2014

(65) Prior Publication Data

US 2014/0295896 A1 Oct. 2, 2014

(30) Foreign Application Priority Data

Mar. 26, 2013 (KR) .................. 10-2013-0032097

(51) Int. Cl.
*H04W 68/08* (2009.01)
*H04W 68/00* (2009.01)
*H04W 52/02* (2009.01)

(52) U.S. Cl.
CPC ..... *H04W 68/005* (2013.01); *H04W 52/0212* (2013.01); *Y02B 60/50* (2013.01)

(58) Field of Classification Search
CPC .................. H04Q 7/00; H04W 64/00
USPC .................. 370/331, 311; 455/436
See application file for complete search history.

(56) References Cited

U.S. PATENT DOCUMENTS

| | | | | |
|---|---|---|---|---|
| 7,826,848 B2* | 11/2010 | Tao et al. | ....... | 455/436 |
| 8,218,466 B2* | 7/2012 | Chin et al. | ....... | 370/311 |
| 2009/0279502 A1* | 11/2009 | Zheng | ....... | H04W 36/0033 370/331 |
| 2011/0065467 A1* | 3/2011 | Park | ....... | H04W 68/08 455/507 |

FOREIGN PATENT DOCUMENTS

KR 10-2011-0004329 1/2011
WO WO 2010147386 A2 * 12/2010 ............ H04W 68/02

* cited by examiner

*Primary Examiner* — Vladimir Magloire
*Assistant Examiner* — Majid Syed

(57) ABSTRACT

Provided is a method and apparatus for operating an idle mode in a wireless communication system. The method includes receiving a first message requesting entry to an idle mode from a Subscriber Station (SS) through at least one Base Station (BS), selecting in response to reception of the first message whether the MS is to enter an idle mode in which BSs belonging to a paging group broadcast a paging message for the MS or whether the MS is to enter a semi-idle mode in which BSs belonging to a semi-idle paging group, which is a subset of the paging group, broadcast the paging message for the SS, and transmitting Paging announce information instructing the BSs belonging to the semi-idle paging group to broadcast the paging message for the SS, if the semi-idle mode is selected.

30 Claims, 15 Drawing Sheets

METHOD AND APPARATUS FOR OPERATING IDLE MODE IN WIRELESS COMMUNICATION SYSTEMS

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Mar. 26, 2013 and assigned Serial No. 10-2013-0032097, the entire disclosure of which is incorporated herein by reference.

TECHNICAL FIELD

The present disclosure generally relates to a wireless communication system, and more particularly, to a method and apparatus for operating an idle mode in a flat network environment.

BACKGROUND

Next-generation wireless communication systems may use high-frequency bands, for example, millimeter Wave (mmW), to support a high-volume data service. For a system using high-frequency bands, a communicable distance between a Mobile Station (MS) and a Base Station (BS) is reduced, such that a cell radius of the BS is also reduced, increasing the number of BSs that should be installed to secure a service area for the MS. As the cell radius of BSs is reduced and the number of BSs increases, the frequency of handovers increases due to movement of the MS between cells, increasing the amount of resulting signaling and resulting consumption of system resources.

The increase in the number of BSs increases requirements for the processing capacity of an access gateway that is connected with a BS to deliver data to the BS and to manage service information and authentication information for a user. Thus, in such a small-cell environment, a centralized network structure may be difficult to apply.

In a small-cell-based wireless communication system, a network structure is needed to increase a data rate while reducing a system load caused by frequent handovers. To solve problems caused by the small-cell structure, a distributed flat network structure has been considered. In a flat network, a small BS is used as a basic geographical unit for communication and several small BSs are grouped to operate as one virtual cell, a cluster.

If a MS have not transmitted or received a signal to or from a BS for a predetermined time, the MS operates in an idle mode for power saving. The MS in the idle mode wakes up in a predetermined cycle while not receiving a signal of the BS, to monitor whether a paging message sent thereto from the BS exists, and determines whether to transit to an active mode. The MS in the idle mode performs location update based on a timer or a paging group to inform a core network of a wireless communication system of its location. The core network recognizes a rough location of the MS according to the location update of the MS, and sends a paging message for the MS if necessary.

The paging group-based location update is performed when the MS moves to a BS of a paging group that is not a paging group to which the BS currently belongs. However, in a flat network structured in which numerous small BSs are directly connected to a higher-layer entity, exchange between many paging-related messages is needed when the MS enters the idle mode and relatively many BSs are included in one paging group.

Therefore, a need exists for a technique for efficient idle-mode operations of the MS in such a flat network structure.

SUMMARY

To address the above-discussed deficiencies, it is a primary object to provide a method and apparatus for transmitting and receiving a signal in a communication system.

Another aspect of the present disclosure is to define idle-mode operations of a MS in a flat network including distributed small BSs.

Further another aspect of the present disclosure is to provide a method and apparatus in which a MS performs an idle handover between BSs of a paging group in a wireless communication system.

Still another aspect of the present disclosure is to provide a method and apparatus for performing an idle handover between distributed small BSs in a wireless communication system.

Yet another aspect of the present disclosure is to provide a method and apparatus in which a MS transits to an idle mode in advance before leaving a paging group in a wireless communication system.

In accordance with an aspect of the present disclosure, there is provided a method for operating an idle mode in a wireless communication system. The method includes receiving a first message requesting entry to an idle mode from a Mobile Station (MS) through at least one Base Station (BS). The method also includes selecting in response to reception of the first message whether the MS is to enter an idle mode in which BSs belonging to a paging group broadcast a paging message for the MS or whether the MS is to enter a semi-idle mode in which BSs belonging to a semi-idle paging group, which is a subset of the paging group, broadcast the paging message for the MS. The method also includes transmitting Paging announce information instructing the BSs belonging to the semi-idle paging group to broadcast the paging message for the MS, if the semi-idle mode is selected.

In accordance with another aspect of the present disclosure, there is provided a method for operating an idle mode in a wireless communication system. The method includes sending a first message requesting entry to an idle mode to a paging controller through at least one BS. The method also includes receiving, in response to the first message, a second message instructing entry of a MS to an idle mode in which BSs belonging to a paging group broadcast a paging message for the MS or entry of the MS to a semi-idle mode in which BSs belonging to a semi-idle paging group, which is a subset of the paging group, broadcast the paging message for the MS. The method also includes operating in the semi-idle mode to determine whether transition to the idle mode is needed, if the second message instructs entry of the MS to the semi-idle mode. The method also includes sending a third message requesting entry to the idle mode to the paging controller, if determining that transition to the idle mode is needed.

In accordance with still another aspect of the present disclosure, there is provided a paging controller apparatus for controlling an idle-mode operation of a MS in a wireless communication system. A paging controller apparatus includes a receiver configured to receive a first message requesting entry to an idle mode from the MS through at least one BS. A controller is configured to select in response to reception of the first message whether the MS is to enter an idle mode in which BSs belonging to a paging group broadcast a paging message for the MS or whether the MS is to enter a semi-idle mode in which BSs belonging to a semi-idle paging group, which is a subset of the paging group, broadcast the paging message for the SS, and a transmitter configured to transmit Paging announce information instructing the BSs belonging to the semi-idle paging group to broadcast the paging message for the SS, if the semi-idle mode is selected.

In accordance with yet another aspect of the present disclosure, there is provided a MS apparatus for operating in an idle mode in a wireless communication system. The MS apparatus includes a transmitter configured to send a first message requesting entry to an idle mode to a paging controller through at least one BS. The MS apparatus also includes a receiver configured to receive, in response to the first message, a second message instructing entry of a MS to an idle mode in which BSs belonging to a paging group broadcast a paging message for the MS or entry of the MS to a semi-idle mode in which BSs belonging to a semi-idle paging group, which is a subset of the paging group, broadcast the paging message for the SS. The MS apparatus also includes a controller configured to operate in the semi-idle mode to determine whether transition to the idle mode is needed, if the second message instructs entry of the MS to the semi-idle mode, and to control the transmitter to send a third message requesting entry to the idle mode to the paging controller, if it is determined that transition to the idle mode is needed.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. Hereinafter, various embodiments of the present disclosure will be described in detail with reference to the accompanying drawings. In the following description of the present disclosure, a detailed description of a well-known function or structure will not be provided if it unnecessarily obscure the subject matter of the present disclosure. Terms used herein are defined based on functions in the present disclosure and may vary according to users, operator intention, or usual practices. Therefore, the definition of the terms used herein should be based on contents throughout the specification.

Figure 1:
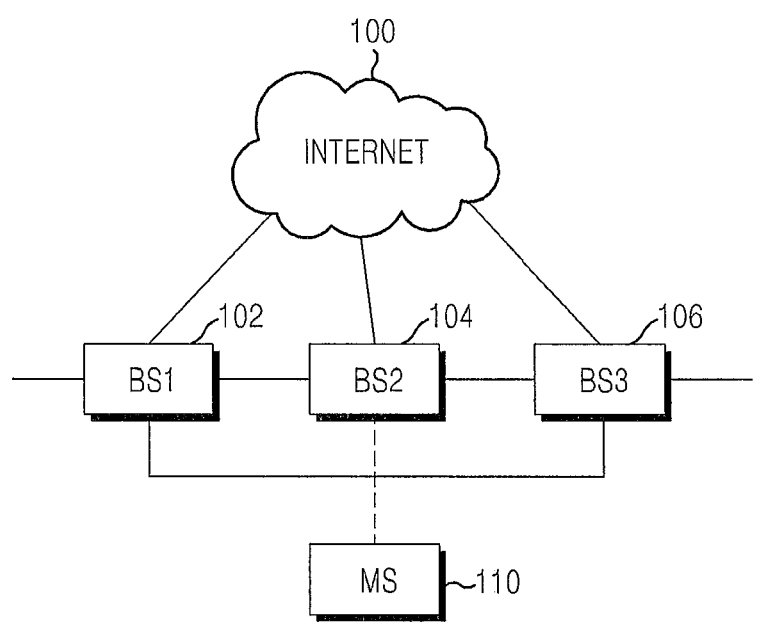
FIG. 1 illustrates a diagram showing a communication system having a distributed flat structure to which the present disclosure is applied.

FIG. 1 illustrates a diagram showing a communication system having a distributed flat structure to which the present disclosure is applied.

Referring to FIG. 1, a wireless communication system may include a plurality of Base Stations (BSs) 102, 104, and 106 configured to serve a Subscriber Station (SS) 110. The MS 110 may be provided with a data service through at least one of the BSs 102, 104, and 106, and the BSs 102, 104, and 106 that serve the MS 110 connects the MS 110 to the Internet 100. Although not shown, a gateway for connecting the BSs 102, 104, and 106 to the Internet 100 or a Central Management Unit (CMU) for controlling operations of the BSs 102, 104, and 106 may be further provided depending on a system configuration scheme.

Figure 2:
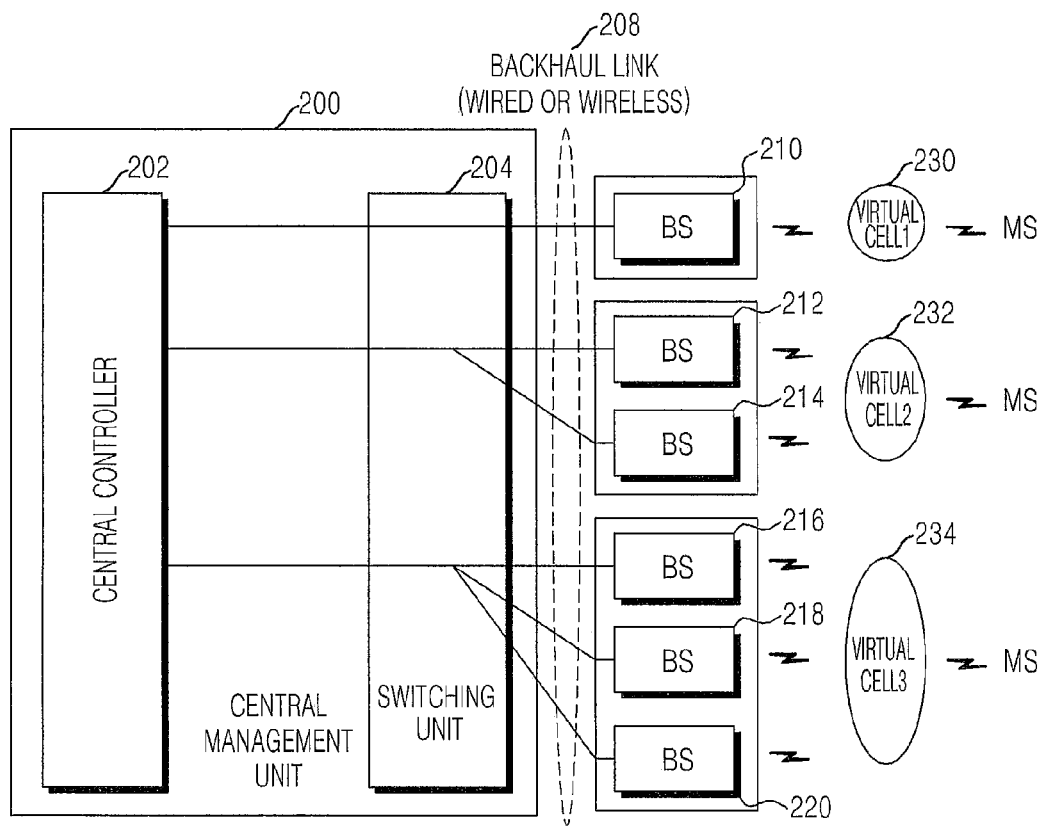
FIG. 2 illustrates a diagram showing a flat network structure including a Central Management Unit (CMU) according to an embodiment of the present disclosure.

FIG. 2 illustrates a diagram showing a flat network structure including a CMU according to an embodiment of the present disclosure.

Referring to FIG. 2, multiple distributed small BSs 210, 212, 214, 216, 218, and 220 connect to a CMU 200 through a backhaul link 208 that may be implemented in a wireless or wired manner. At least some of the BSs 210 to 220 may be grouped into clusters that serve virtual cells 230, 232, and 234. The cluster of the virtual cell 1 230 includes the BS 210, the cluster of the virtual cell 2 232 includes the BSs 212 and 214, and the cluster of the virtual cell 3 234 includes the BSs 216, 218, and 220.

The CMU 200 is connected to the BSs 210 to 220 through a switching unit 204. The switching unit 204 connects the BSs 210 to 220 to a central controller 202 on a cluster basis. The central controller 202 may have a function of a paging controller that controls paging operations of the BSs 210 to 220. In another embodiment, the paging controller may be a higher-layer entity that manages a plurality of CMUs. If a call is generated for a MS or transmission of a data packet is needed, a paging controller may request a BS to which the MS belongs and/or BSs of a paging group to which the MS belongs to transmit a paging message. The paging message refers to a Paging Advertisement (Paging_adv) message sent through a paging channel or a broadcast channel. In this way, by allowing only the BS to which the MS belongs and/or the BSs of the paging group to which the MS belongs to send the Paging_adv message, signaling overhead of the BSs may be reduced.

Figure 3:
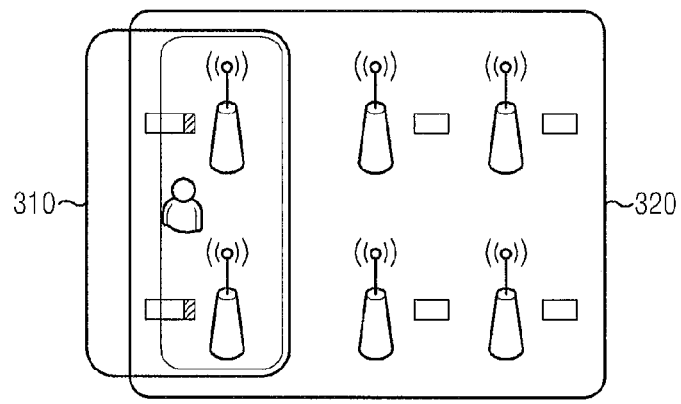
FIG. 3 illustrates a relationship between a paging group and a semi-idle paging group according to an embodiment of the present disclosure.

FIG. 3 illustrates a relationship between a paging group and a semi-idle paging group according to an embodiment of the present disclosure.

Referring to FIG. 3, a paging group 320 is a zone that is a unit of an idle handover of SSs in the idle mode, and may include a plurality of BSs. In an embodiment, the paging group 320 includes BSs managed by one paging controller. A semi-idle paging group 310 is a subset of the paging group 320. A MS located in the semi-idle paging group 310 receives a Paging_adv message from BSs that belong to the semi-idle paging group 310. In an embodiment, the semi-idle paging group 310 may be the same as a virtual cell or a cluster that means a group of BSs participating in cooperative communication for a MS (or having participated in cooperative communication for the MS since entry to an idle mode was requested). In another embodiment, if the paging controller includes a plurality of CMUs, the semi-idle paging group 310 may be the same as a group of BSs that belong to one CMU.

Figure 4:
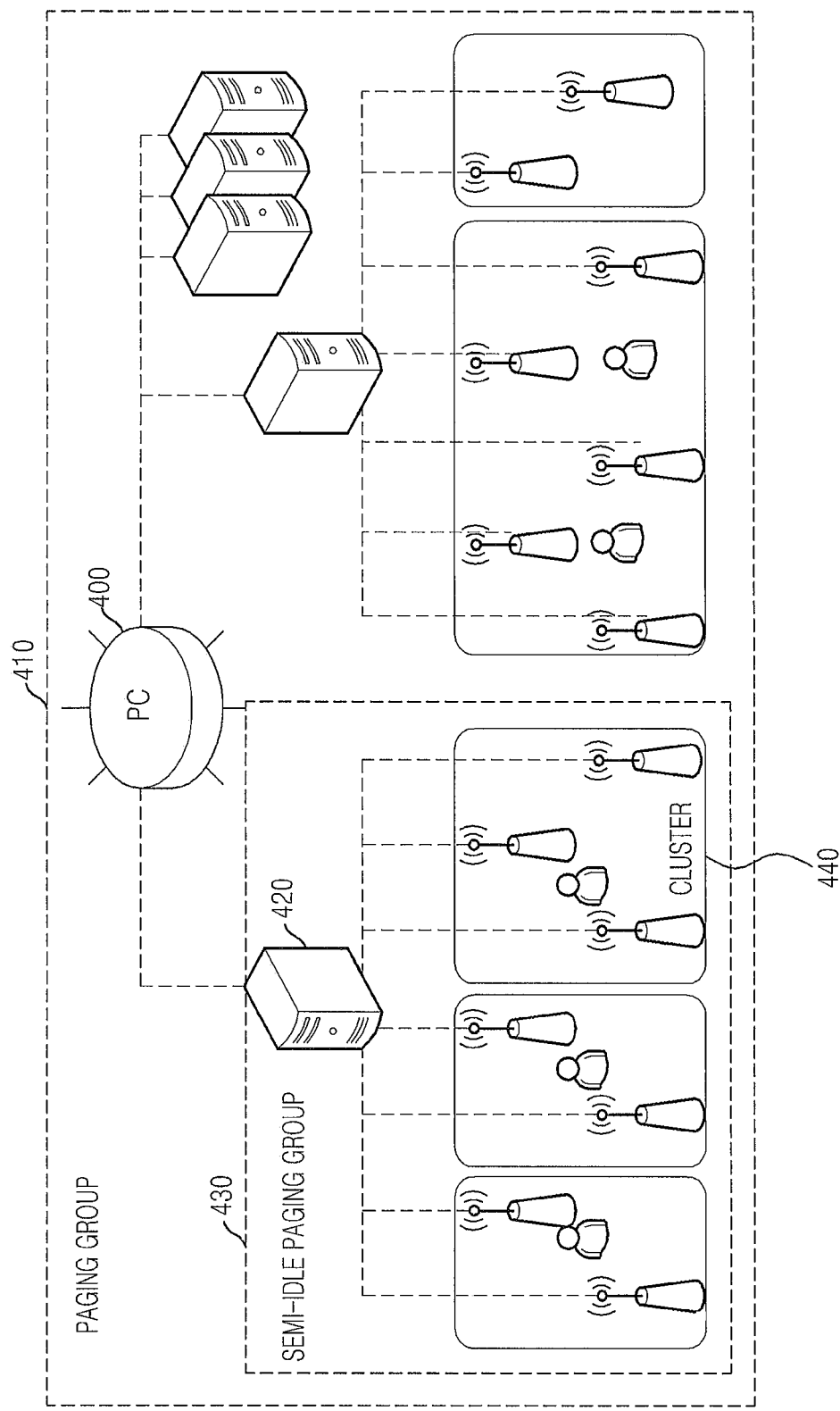
FIG. 4 illustrates a configuration example of a paging group and a semi-idle group according to an embodiment of the present disclosure.

FIG. 4 illustrates a configuration example of a paging group and a semi-idle group according to an embodiment of the present disclosure.

Referring to FIG. 4, a paging controller 400 controls a plurality of CMUs 420, each of which manages a plurality of BSs. One or more of BSs may form a cluster 440. In the shown example, all BSs controlled by the paging controller 400 form the same paging group 410. In another embodiment, the one cluster 440 may be regarded as being the same as the semi-idle paging group 430.

The paging controller 400 applies the same MS list to the BSs that belong to the paging group 410, but applies different MS lists to the BSs that belong to the semi-idle paging group 430. SSs belonging to the BSs of the semi-idle paging group 430 are candidates that operate in a semi-idle mode, and may operate in the semi-idle mode if a predetermined condition is satisfied. The semi-idle mode means an operation mode applied when a MS initially enters the semi-idle paging group 430, and the MS transits to an idle mode when leaving the semi-idle paging group 430.

Figure 5:
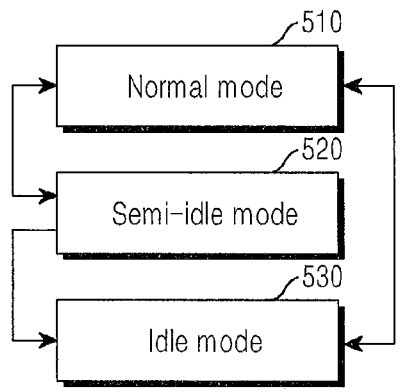
FIG. 5 illustrates a state transition diagram showing definition of a semi-idle mode according to an embodiment of the present disclosure.

FIG. 5 illustrates a state transition diagram showing definition of a semi-idle mode according to an embodiment of the present disclosure. As is shown, a semi-idle mode 520 is positioned between a normal mode 510 and an idle mode 530.

Referring to FIG. 5, the normal mode 510 means a state in which a MS is connecting a call or data packets being transmitted exist. The idle mode 530 refers to a state in which the MS is not connecting a call or data packets being transmitted do not exist. If a predetermined condition is satisfied in the normal mode 510, the MS transits to a semi-idle mode 520, and if a predetermined condition is satisfied in the semi-idle mode 520, the MS transits to the idle mode 530. If network connection is needed in the semi-idle mode 520, the MS transits to the normal mode 510. If network connection is used in the idle mode 530, the MS transits directly to the normal mode 510 without transiting to the semi-idle mode 520.

A condition for transition between modes will be described in detail later.

Figure 6:
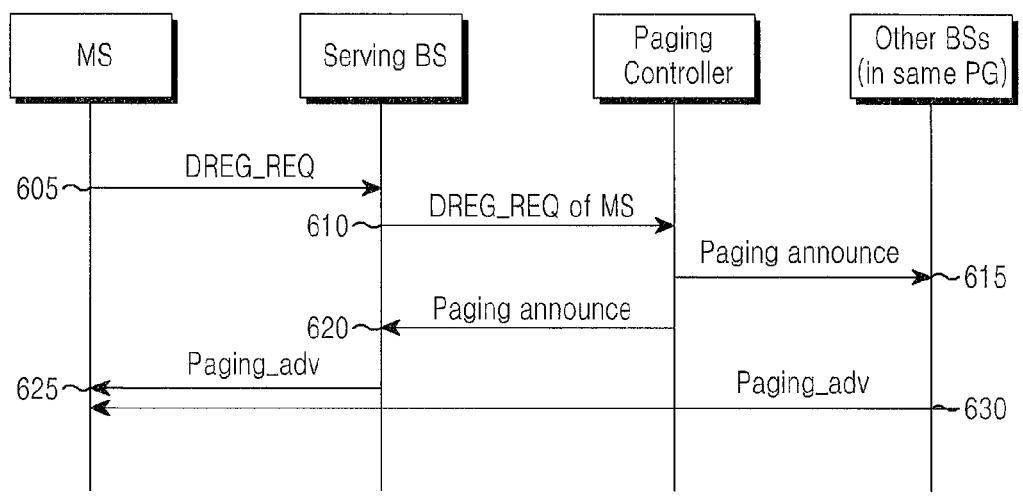
FIG. 6 illustrates a message flow showing an idle mode entry procedure according to an embodiment of the present disclosure.

FIG. 6 illustrates a message flow showing an idle mode entry procedure according to an embodiment of the present disclosure.

Referring to FIG. 6, if data traffic corresponding to transmission or reception of data to or from a serving BS does not exist for a predetermined time or if a MS desires to terminate connection to the serving BS, the MS sends a Deregistration Request (DREG_REQ) message to the serving BS to transit to the idle mode in operation 605. In operation 610, the serving BS delivers the DREG_REQ message to a paging controller, together with an identifier of the SS. For example, the serving BS may send the identifier of the SS, for example, a Media Access Control (MAC) address, through an idle information request message for requesting transition of the MS to the idle mode, and may receive a response message indicating that the MS transits to the idle mode from the paging controller in response to the idle information request message.

The paging controller having received an idle mode transition request of the MS from the serving BS manages paging of the MS based on a final location of the SS. Although not shown, as the paging controller completes deregistration of the SS, the serving BS sends paging information, such as a Paging Group ID (PGID), a paging cycle, a paging offset, and a paging interval length, to the MS through a Deregistration Command (DREG_CMD) message, thereby permitting the MS to enter the idle mode.

The MS in the idle mode receives a Paging_adv message that is broadcast from a BS in every cycle agreed with the SS, and determines whether to maintain the idle mode, terminate the idle mode, or perform a location update procedure.

In operations 615 and 620, the paging controller delivers Paging announce messages to BSs of a paging group of a serving BS in which the MS is currently located, such that each BS sends a Paging_adv message for the SS. In operations 625 and 630, the serving BS, and other BS(s) belonging to the same paging group broadcast Paging_adv messages generated based on the Paging announce message. Each BS may include information instructing the MS to perform a particular operation in the Paging_adv message in response to an instruction from the paging controller. The MS receives a Paging_adv message from at least one neighboring BS and responds to paging if necessary.

Figure 7:
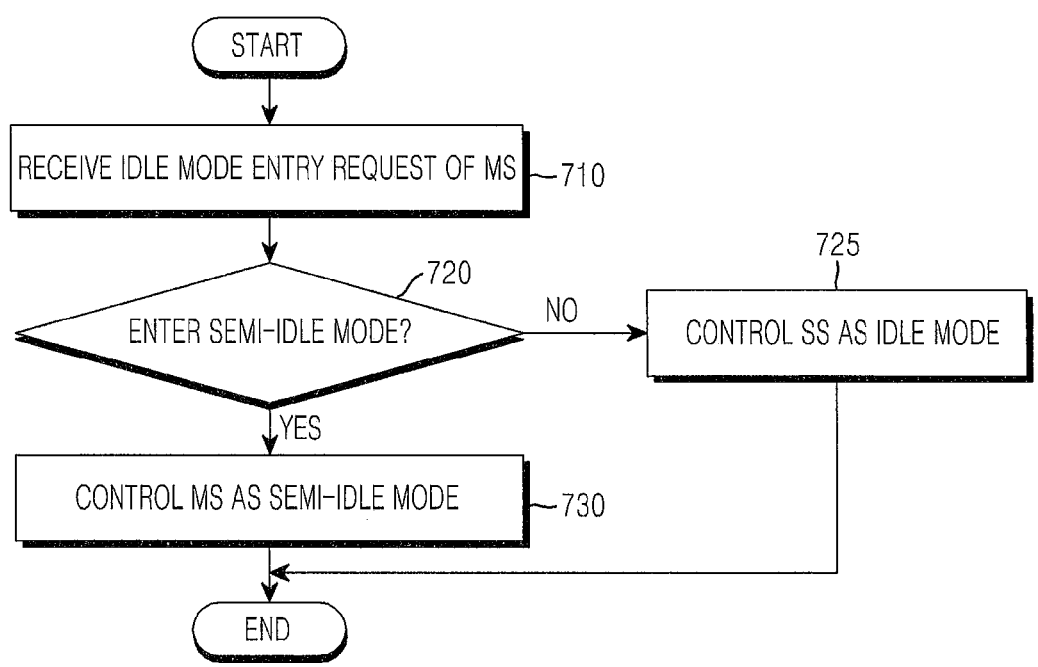
FIG. 7 illustrates a process of a semi-idle mode entry procedure according to an embodiment of the present disclosure.

FIG. 7 illustrates a process of a semi-idle mode entry procedure according to an embodiment of the present disclosure. Operations illustrated in FIG. 7 may be performed by the paging controller.

Referring to FIG. 7, in operation 710, the paging controller receives a DREG_REQ message requesting entry of a MS to the idle mode, together with the ID of the SS, from a serving BS in which the MS is located. In operation 720, the paging controller determines whether the MS is to enter the semi-idle mode or the idle mode. A condition for the determination will be described in more detail later.

Unless the paging controller determines that the MS is to enter the semi-idle mode, the paging controller manages the MS as the idle mode in operation 725. If the MS is managed in the idle mode, the paging controller adds the MS to a MS list for a paging group to which the serving BS belongs, and delivers Paging announce information for the MS to BSs belonging to the paging group. Then, the BSs of the paging group broadcast Paging_adv messages for the SS.

Alternatively, if determining that the MS is to enter the semi-idle mode in operation 720, then the paging controller manages the MS as the semi-idle mode in operation 730. If the MS is managed in the semi-idle mode, the paging controller generates a MS list for a cluster to which the serving BS of the MS belongs, that is, for a semi-idle paging group, if necessary, and adds the MS to the MS list, and then delivers Paging announce information for the MS to at least one BS belonging to the semi-idle paging group. The BS belonging to the semi-idle paging group broadcasts a Paging_adv message for the SS.

Figure 8:
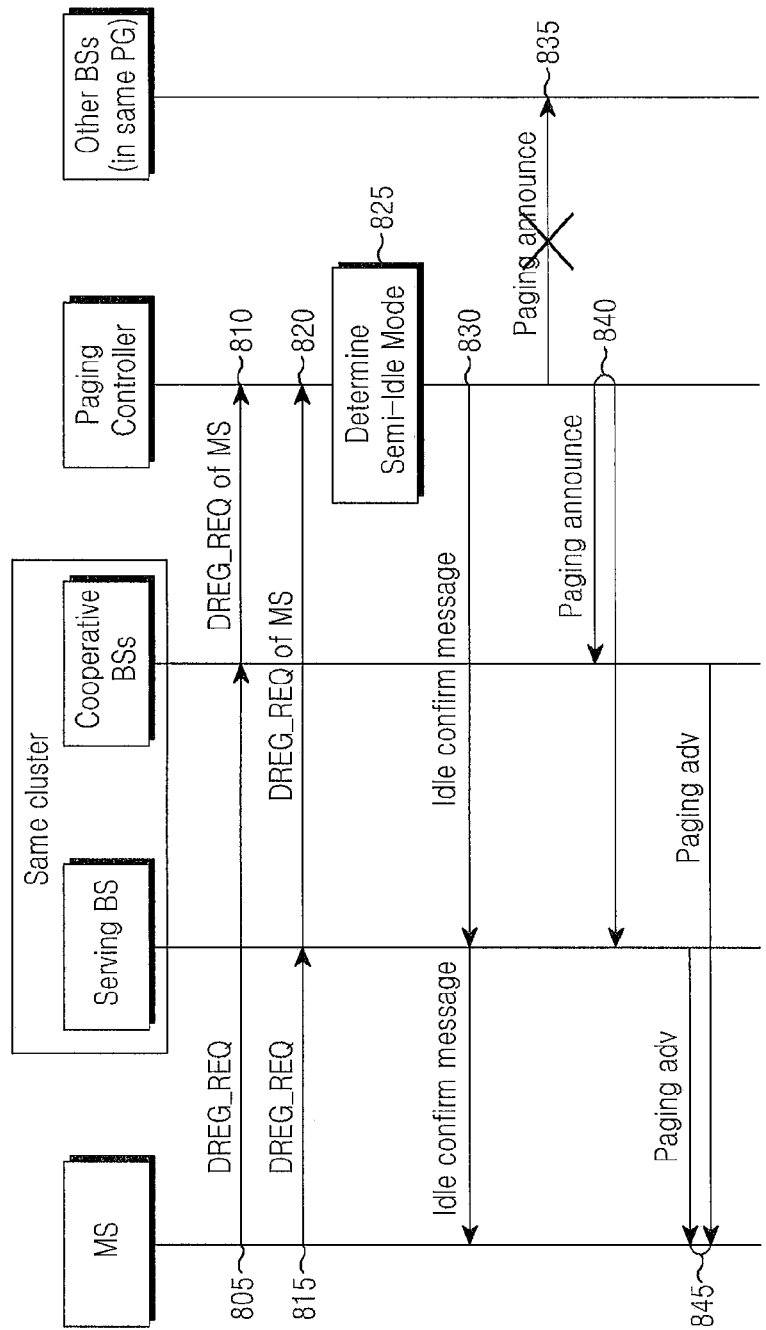
FIG. 8 illustrates a message flow showing a semi-idle mode entry procedure according to an embodiment of the present disclosure.

FIG. 8 illustrates a message flow showing a semi-idle mode entry procedure according to an embodiment of the present disclosure. Herein, a description will be made of an embodiment where a MS has a cluster including a plurality of BSs participating in BS cooperative communication, and the cluster is the same as a semi-idle paging group.

Referring to FIG. 8, if data traffic corresponding to transmission or reception of data to or from a serving BS and at least one cooperative BS in the same cluster does not exist for a predetermined time or if a MS desires to terminate connection, the MS sends a DREG_REQ message to the BSs in its cluster or the serving BS to request transition to the idle mode in operations 805 and 815. In operations 810 and 820, BS(s) in the cluster delivers the DREG_REQ message and the identifier of the MS to the paging controller. For example, each BS may transmit the identifier of the SS, for example, a MAC address, through an idle information request message for requesting transition of the MS to the idle mode.

In operation 825, if the MS is expected to stay at the cluster, that is, at the semi-idle paging group for a predetermined time or more, the paging controller permits the semi-idle mode for the SS. If the semi-idle mode is not permitted for the SS, the paging controller manages the MS in the idle mode.

In a selectable embodiment, in operation 830, the paging controller sends an Idle confirm message to the serving BS or BSs having transmitted the DREG_REQ message, to respond to the MS that entry to the semi-idle mode or the idle mode is permitted. Then, corresponding BS(s) deliver the Idle confirm message to the MS to notify the MS that the MS enters the semi-idle mode or the idle mode. Although it is shown in FIG. 8 that the Idle confirm message is used to confirm the SS's entry to the idle mode, the BS may notify the MS that the MS enters the idle mode or the semi-idle mode by using a DREG_CMD message responding to a DREG_REQ message of the MS in another embodiment. The idle confirm message may include, for example, a 1-bit information field, and if the information field has a value of '0', it may instruct transition to the idle mode; for the information field of '1', it may instruct transition to the semi-idle mode.

In operation 840, the paging controller determines whether the MS is managed in the semi-idle mode, and if the MS is managed in the semi-idle mode, the MS delivers a Paging announce message for the MS to BSs of a semi-idle paging group of a serving BS in which the MS is currently located, if the MS is managed in the semi-idle mode. In this embodiment, the Paging announce message for the MS is not delivered to other BSs in the same paging group in operation 835. In operation 845, other BS(s) belonging to the same cluster as the serving BS broadcast Paging_adv messages for the MS in response to the Paging announce message. In this embodiment, Paging announce information for the MS is not delivered to other BS(s) belonging to the same paging group as the serving BS, such that the other BS(s) do not transmit a Paging_adv message related to the SS.

The MS in the idle mode receives a Paging_adv message broadcast from at least one neighboring BS in every agreed paging cycle, and determines whether to maintain the idle mode, terminate the idle mode, or perform a location update procedure.

Hereinafter, a condition for determining entry of the MS to the semi-idle mode by the paging controller will be described.

In an embodiment, the paging controller determines entry of the MS to the semi-idle mode by using a DREG_REQ message sent from the SS. In an embodiment, the MS sends the DREG_REQ message to request entry of the MS to the idle mode. The serving BS of the MS and the neighboring BSs of the MS receive the DREG_REQ message and reports reception of the DREG_REQ message, together with the identifier of the SS, to the paging controller. If the MS has a cluster for BS cooperative communication and all BSs or a predetermined rate of BSs in the semi-idle paging group that is the same as the cluster receive the DREG_REQ message of the SS, the paging controller may expect that the MS may stay in the semi-idle paging group at least for a predetermined time or more because the MS is not located in an edge of the semi-idle paging group. Thus, in this embodiment, the paging controller permits the MS to enter the semi-idle mode.

In an embodiment, if the DREG_REQ message having the identifier of the same SSS has been received by different BSs belonging to the semi-idle paging group of the MS in a predetermined time range, the paging controller determines the number of BSs having reported reception of the same DREG_REQ message and determines whether the number of BSs is equal to the number of all BSs belonging to the cluster of the MS or exceeds a predetermined rate (for example, 70%) of the number of all BSs. If the number of BSs is equal to the number of all BSs belonging to the cluster of the MS or exceeds a predetermined rate (for example, 70%) of the number of all BSs, the paging controller manages the MS in the semi-idle mode. If determining that the MS is expected to enter the semi-idle mode, the paging controller sets the information field of the idle confirm message to '1' to transmit the idle confirm message to the MS through the serving BS or the at least one BS included in the cluster. Alternatively, if the foregoing condition is not satisfied, the paging controller sends the idle confirm message including the information field set to '0' to the MS through the at least one BS.

In another embodiment, the paging controller determines entry of the MS to the semi-idle mode by using a signal measurement result from the SS. In an embodiment, when sending a DREG_REQ message for requesting entry to the idle mode, the MS sends the signal measurement result obtained with respect to reference signals received from neighboring BSs through the DREG_REQ message. The signal measurement result may include, for example, at least one of a received signal quality, a received signal strength, a Signal-to-Noise Ratio (SNR), and a Signal to Interference and Noise Ratio (SINR) of each BS.

The paging controller receives the DREG_REQ message of the MS through the at least one BS and compares received signal strengths of BSs included in the DREG_REQ message.

In another example, whenever the MS periodically or aperiodically reports a signal measurement result to BS(s), the BS delivers the signal measurement result of the MS to the paging controller through a separate message. The BS may deliver the signal measurement result of the MS to the paging controller according to a report cycle that is different from that of the SS. The paging controller stores the signal measurement result reported for the SS, and determines entry of the MS to the semi-idle mode by using received signal strengths of the most recently stored signal measurement result when receiving the DREG_REQ message from the SS. In further another example, the BS(s) connected with the MS stores the signal measurement result reported from the MS and delivers the most recently stored signal measurement result to the paging controller through the DREG_REQ message of the MS upon receiving the DREG_REQ message from the SS. The signal measurement result of the MS reported to the paging controller may include received signal strengths of all BSs the MS has monitored or received signal strengths of BSs included in the cluster of the SS.

After checking the signal measurement result, if the received signal strengths of BSs that do not belong to the semi-idle paging group of the MS are not stronger than those of BSs belonging to the semi-idle paging group, the paging controller expects the MS to stay at the semi-idle paging group at least for a predetermined time or more, because the MS is not located in the edge of the semi-idle paging group, and permits entry of the MS to the semi-idle mode. In other words, if BSs belonging to the cluster of the MS have higher received signal strengths than the BSs that do not belong to the cluster among BSs to which the signal measurement result is reported, then the paging controller selects the semi-idle mode for the SS.

Alternatively, the received signal strengths of at least one BSs that do not belong to the semi-idle paging group of the MS are higher than those of at least one BSs belonging to the semi-idle paging group or all BSs belonging to the semi-idle paging group, the paging controller expects that the MS is highly likely to leave the semi-idle paging group because of being located in the edge of the semi-idle paging group, and thus does not permit entry of the MS to the semi-idle mode. In other words, the paging controller determines that the MS is to enter the idle mode.

In still another embodiment, the paging controller determines entry of the MS to the semi-idle mode, based on mobility of the SS. For example, the paging controller continuously manages change details of BSs to which the MS connects or change details of the semi-idle paging group of the SS, and determines that the mobility of the MS is not high if the number of changes of a BS or a semi-idle paging group of the MS within a recent predetermined time T is less than a predetermined reference value M. If the mobility of the MS is not high, the paging controller determines that the MS is highly likely to stay in the current semi-idle paging group for a predetermined time or more, and permits the MS to enter the semi-idle mode. Alternatively, if the number of changes of the BS or the semi-idle paging group of the MS within the recent predetermined time T is less than the predetermined reference value M, then the paging controller determines to manage the MS in the idle mode. The paging controller sends the idle confirm message to the MS based on the determination result.

In a selectable embodiment, the paging controller receives information about mobility of the SS, for example, BS change details, from a movement management entity, and determines whether the MS is to enter the semi-idle mode based on the received mobility information when entry to the idle mode is requested by the SS. In yet another embodiment, the MS reports information about its mobility, for example, BS change details or recent moving speed to the paging controller through the DREG_REQ message, to use the information for determining entry of the MS to the semi-idle mode.

Figure 9:
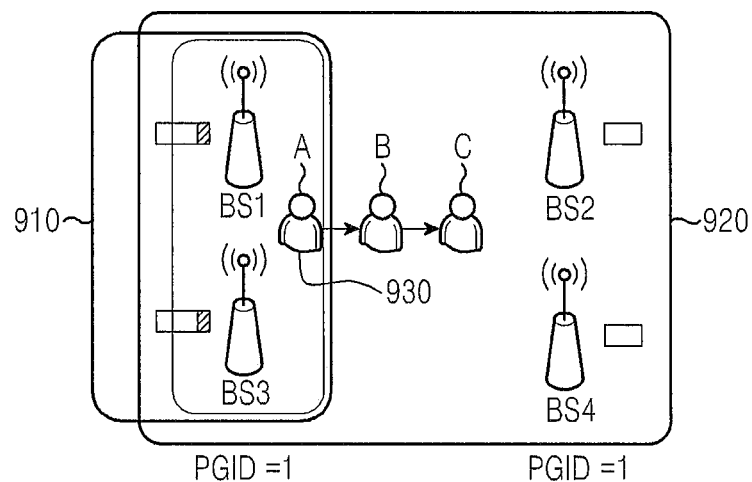
FIG. 9 illustrates a timeline of an idle handover procedure in a paging group according to an embodiment of the present disclosure.

FIG. 9 illustrates a timeline of an idle handover procedure in a paging group according to an embodiment of the present disclosure.

Referring to FIG. 9, a paging group 920 may include BSs BS1, BS2, BS3, and BS4, and a semi-idle paging group 920, which is a subset of the paging group 920, may include BS1 and BS3. BS1 to BS4, which are included in the same paging group 920, have the same Paging Group Identifications (PGIDs). Herein, suppose that PGID=1. A MS 930 moves from a location A near BS1 included in the semi-idle paging group 910 to a location C near BS2 that is not included in the semi-idle paging group 910 through a location B. In this embodiment, the MS 930 operates in the semi-idle mode in the location A, and when leaving the semi-idle paging group 910, transits to the idle mode.

A description will be made of embodiments for sensing that the MS 930 in the semi-idle mode leaves the semi-idle paging group 910.

Figure 10:
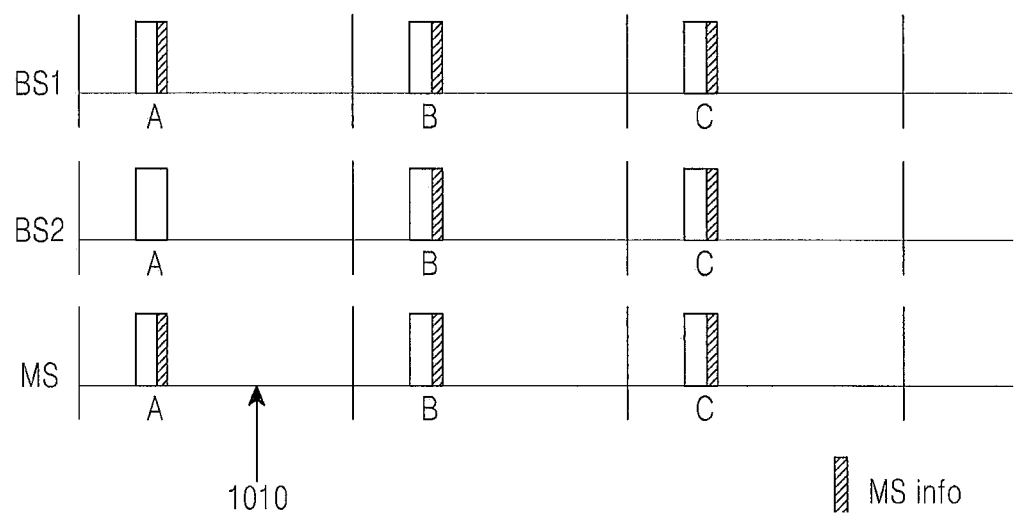
FIG. 10 illustrates a timeline for paging operations of BSs along with movement of a MS according to an embodiment of the present disclosure.

FIG. 10 illustrates a timeline for paging operations of BSs along with movement of a MS according to an embodiment of the present disclosure. Herein, movement of the MS illustrated in FIG. 9 is referred to.

Referring to FIG. 10, in the location A, BS1 included in the semi-idle paging group 910 sends information (identifier) of the MS 930 through an a Paging_adv message, and BS2 that is not included in the semi-idle paging group 910 sends a Paging_adv message that does not include the identifier of the MS 930. The MS 930 in the semi-idle mode receives the Paging_adv messages from BS1.

The MS 930 senses that it leaves the semi-idle paging group 910 when moving from the location A to the location B, and sends a request for transition from the semi-idle mode to the idle mode to a serving BS as indicated in 1010. The paging controller senses the idle mode transition request of the MS 930 through the serving BS, and starts managing the MS 930 in the idle mode. Then, in the locations B and C, BS1 and BS2 of the paging group 920 may send Paging_adv messages for the MS 930.

Figure 11:
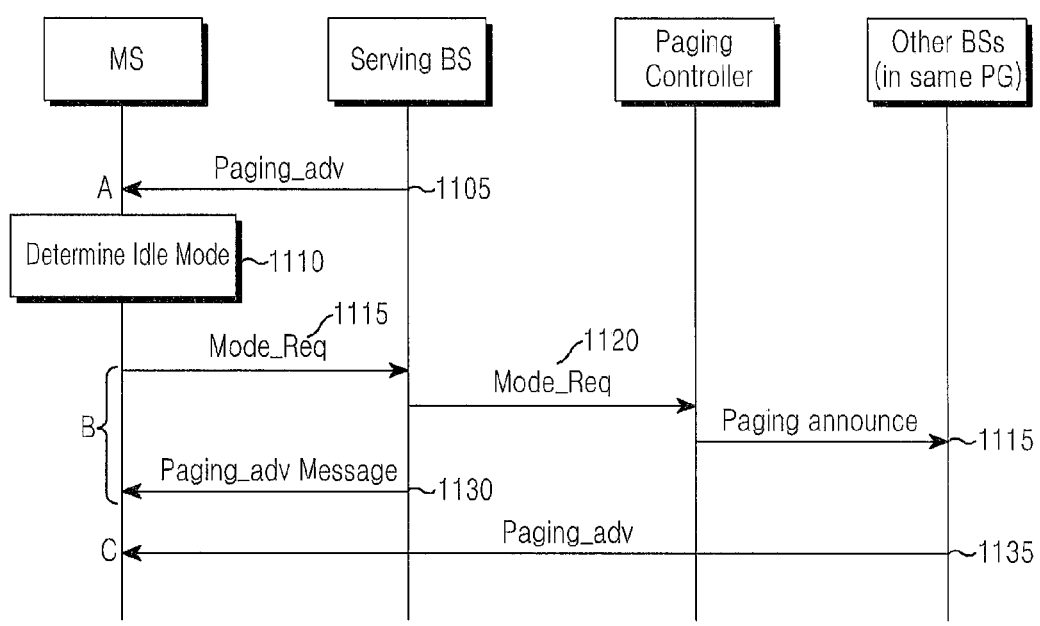
FIG. 11 illustrates a message flow showing an idle mode transition procedure for a MS according to an embodiment of the present disclosure.

FIG. 11 illustrates a message flow showing an idle mode transition procedure for a MS according to an embodiment of the present disclosure.

Referring to FIG. 11, in operation 1105, a MS in the semi-idle mode periodically receives Paging_adv messages from BSs of the semi-idle paging group including the serving BS. In operation 1110, the MS senses that a handover between paging groups is expected to occur due to weakening of the signal strength of the received Paging_adv message or mobility of the SS. In operation 1115, the MS sends a mode request (Mode_Req) message for requesting transition to the idle mode to the serving BS. In operation 1120, the serving BS delivers the Mode_Req message to the paging controller, together with the identifier of the SS. In operation 1125, the paging controller changes the state of the MS from the semi-idle mode to the idle mode in response to the Mode_Req message, and then sends a Paging announce message including paging information related to the MS to all BSs of the paging group to which the serving BS of the MS belongs. Then, in operations 1130 and 1135, all BSs of the paging group including the serving BS start sending Paging_adv messages related to the SS. Thus, the MS may normally receive a Paging_adv message from BS2 even after moving to the location C.

Figure 12:
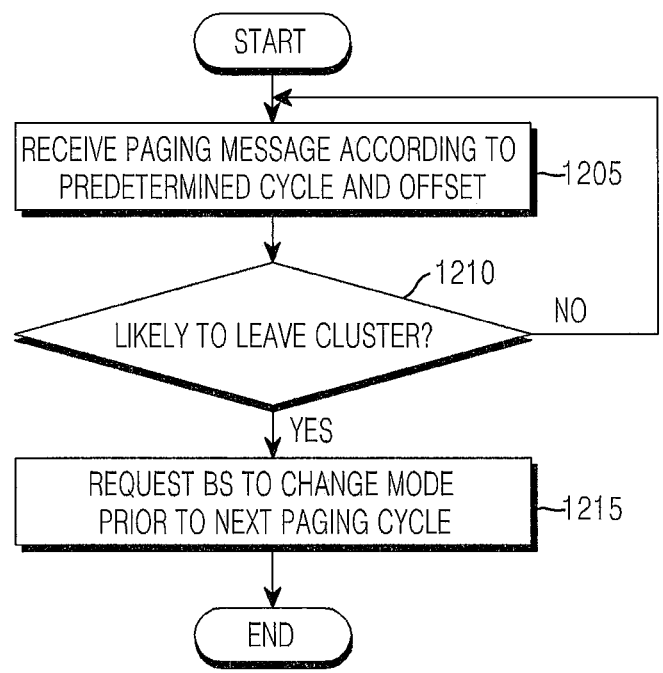
FIG. 12 illustrates a process of idle mode transition operations of a MS according to an embodiment of the present disclosure.

FIG. 12 illustrates a process of idle mode transition operations of a MS according to an embodiment of the present disclosure.

Referring to FIG. 12, in operation 1205, the MS in the semi-idle mode receives Paging_adv messages from the serving BS and the other BS(s) in the cluster based on given paging parameters, that is, a paging cycle, a paging offset, and a PGID. In operation 1210, the MS determines whether the MS in the semi-idle mode is likely to leave the current cluster according to a predetermined cycle or a particular triggering condition. If the MS is not likely to leave the current cluster, the MS returns to operation 1205 to maintain the semi-idle mode. Alternatively, if the MS is likely to leave the current cluster, the MS sends the Mode_Req message requesting change to the idle mode to the serving BS prior to arrival of the next paging cycle. Although not shown, a response message indicating that change to the idle mode has been completed may be received by the MS from the serving BS or at least one BS of the same paging group in response to the Mode_Req message.

A description will now be made of a condition for determining transition of the MS from the semi-idle mode to the idle mode.

In an embodiment, the MS determines whether to transit to the idle mode by using a signal measurement result with respect to neighboring BSs. The MS in the semi-idle mode receives signals (for example, a paging message or a reference signal) from BSs of the semi-idle paging group and measures received signal strengths of the received signals. If the received signal strengths of the BSs of the semi-idle paging group all are less than a predetermined threshold value, the MS may determine that transition to the idle mode is needed. In another embodiment, the MS may request transition to the idle mode if the number of BSs corresponding to the received signal strengths being less than the predetermined threshold value exceeds a predetermined rate (for example, 70%) of the number of all BSs. In further another embodiment, the MS continuously tracks its mobility, for example, change details of a BS or change details of a semi-idle paging group, and if determining that the mobility is high, the MS may request transition to the idle mode. In an embodiment, the MS may determine to transit to the idle mode if the number of changes of a BS or the semi-idle paging group within a predetermined recent time exceeds a predetermined threshold value.

In an embodiment described below, the MS in the semi-idle mode may transit to the idle mode if not normally receiving a paging message from a BS of the semi-idle paging group.

BSs supporting the semi-idle mode send Paging_adv messages including identifiers of semi-idle mode SSs belonging to the same semi-idle paging group, for example, MAC addresses or identification information generated based on the MAC addresses, in every paging cycles in a broadcast manner. The semi-idle mode MS receives the Paging_adv messages and confirms its identification information included therein, thus determining that the idle mode normally operates in the semi-idle paging group.

If the MS leaves its semi-idle paging group and receives a Paging_adv message from another BS of the same paging group, the Paging_adv message does not include identification of the SS. If having received the Paging_adv message that does not include the identification information of the SS, the MS determines to transit to the idle mode from the semi-idle mode and sends a Mode_Req message for requesting transition to the idle mode to the BS in the current location, that is, the BS that broadcasts the Paging_adv message. The paging controller senses the mode transition request of the MS through the BS, manages the MS in the idle mode, and delivers the Paging announce message to BSs in the paging group, such that each BS sends Paging_adv messages for the SS.

After the MS transits to the idle mode, the paging controller may apply an old paging offset to the MS or may apply a new paging offset to allow the MS to receive the Paging_adv message of the new BS as quickly as possible.

Figure 13:
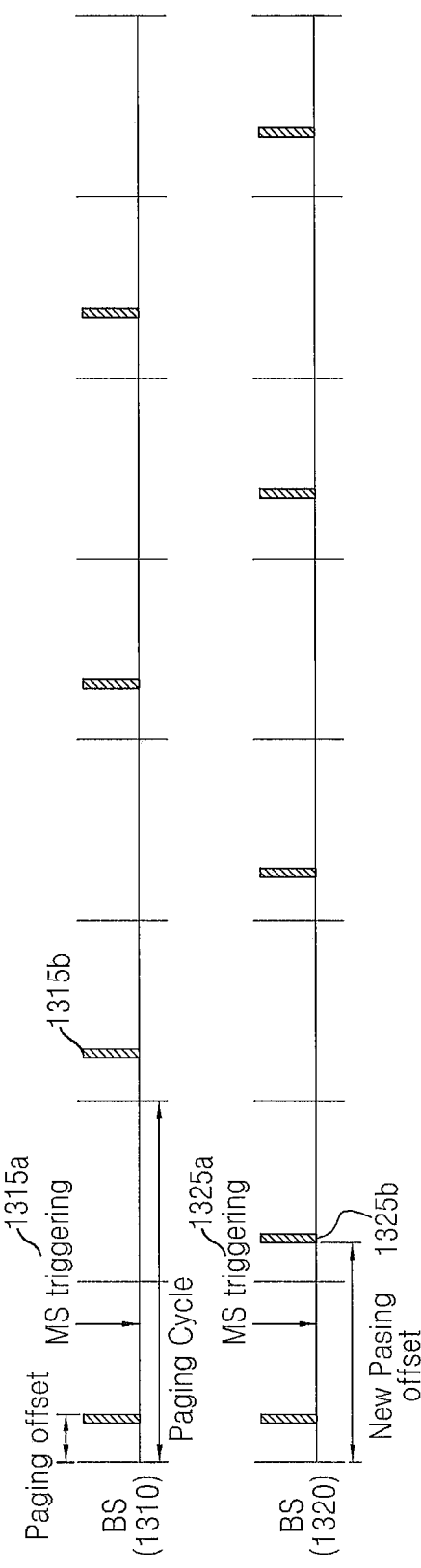
FIG. 13 illustrates a paging offset change caused by an idle mode change of a MS according to an embodiment of the present disclosure.

FIG. 13 illustrates a paging offset change caused by an idle mode change of a MS according to an embodiment of the present disclosure.

Referring to FIG. 13, a reference numeral 1310 indicates a paging reception point-in-time of a MS when a paging offset is not changed, and a reference numeral 1320 indicates the paging reception point-in-time of the MS when the paging offset is changed.

The MS receives a Paging_adv message according to a current paging offset at the point-in-time 1310, and triggers transition to the idle mode at the point-in-time 1315. After the MS transits to the idle mode, paging parameters, especially, the paging offset, are not changed, such that the MS receives a Paging_adv message from a new BS in the next paging cycle at a point-in-time 1315b corresponding to the same paging offset.

After the MS receives a Paging_adv message according to the current paging offset at a point-in-time 1320, the MS triggers transition to the idle mode at a point-in-time 1325a. The paging controller recognizes transition of the MS to the idle mode and sends a Paging announce message to a new BS. The paging controller determines to change paging parameters, especially, a paging offset for the MS according to a predetermined condition, and transmits a new paging offset to the MS through a new BS. For example, the new paging offset may be sent to the MS from the new BS through a DREG_CMD message.

If receiving the new paging offset, the MS receives a Paging_adv message from the new BS at a point-in-time 1325b corresponding to the new paging offset in the current paging cycle. In the next paging cycle, the MS receives a Paging_adv message according to the new paging offset.

Figure 14:
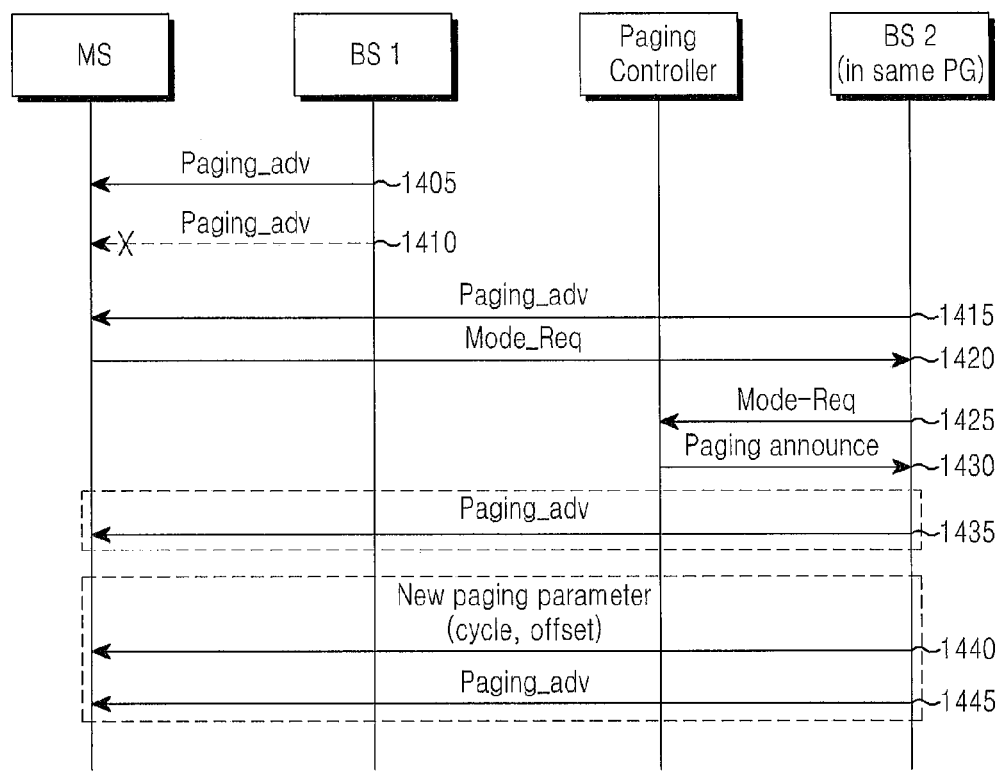
FIG. 14 illustrates a message flow showing an idle mode transition procedure of a MS according to another embodiment of the present disclosure.

FIG. 14 illustrates a message flow showing an idle mode transition procedure of a MS according to another embodiment of the present disclosure.

Referring to FIG. 14, in operation 1405, the semi-idle mode MS periodically receives Paging_adv messages from BSs of the semi-idle paging group including the current serving BS, BS1. When leaving the semi-idle paging group, the MS fails to receive the Paging_adv message from BS1 in operation 1410. In operation 1415, the MS receives the Paging_adv message from BS2 that does not belong to the semi-idle paging group, but belongs to the same paging group, and confirms that identification information of the MS is not included in the Paging_adv message. Then, in operation 1420, the MS sends the Mode_Req message to BS2 to request change to the idle mode.

In operation 1425, BS2 delivers the Mode_Req message of the MS to the paging controller, together with the identifier of the SS. In operation 1430, the paging controller changes the state of the MS from the semi-idle mode to the idle mode in response to the Mode_Req message, and sends a Paging announce message including paging information related to the MS to all BSs of the paging group including BS2. If the paging controller changes the paging offset of the SS, the Paging announce message may further include a new paging offset.

Operation 1435 corresponds to an operation if the paging offset of the MS is not changed, and operations 1440 and 1445 correspond to operations if the paging offset of the MS is changed.

In operation 1435, the BSs of the paging group including BS2 start broadcasting Paging_adv messages for the MS according to the old paging offset.

In operation 1440, BS2 or at least one BS of the paging group transmits new paging parameters determined for the SS, for example, a paging cycle and/or a paging offset, to the SS. The new paging parameters may be delivered through, for example, the DREG_CMD message or a separate message. In operation 1445, BS2 and the BSs in the paging group periodically send Paging_adv messages for the MS according to the new paging parameters.

In an embodiment, when receiving an idle mode entry request of the MS through a new BS the MS enters, the paging controller determines whether the MS may receive a Paging_adv message in the current paging cycle, according to the current paging offset of the MS and a point in time at which the MS requests transition to the idle mode. For example, if the remaining period at the requesting point-in-time in the current paging cycle is greater than a predetermined value (for example, ⅓ of the paging cycle), then the paging controller determines that the MS may receive the Paging_adv message in the current paging cycle and thus determines to change the paging offset. In this embodiment, the paging controller properly determines a new paging offset in the remaining period of the current paging cycle and delivers the new paging offset to the MS through the new BS. Once the new paging offset is applied, the MS may receive a Paging_adv message from the new BS as quickly as possible.

In another embodiment, the paging controller determines whether to change paging parameters by using a backhaul delay bound, the old paging cycle of the SS, and a point-in-time at which the MS receives the Mode-Req message, and sets new paging parameters.

In further another embodiment, the paging controller may provide in advance information about a paging offset to be used in the idle mode to the MS when the MS enters the semi-idle mode.

Figure 15:
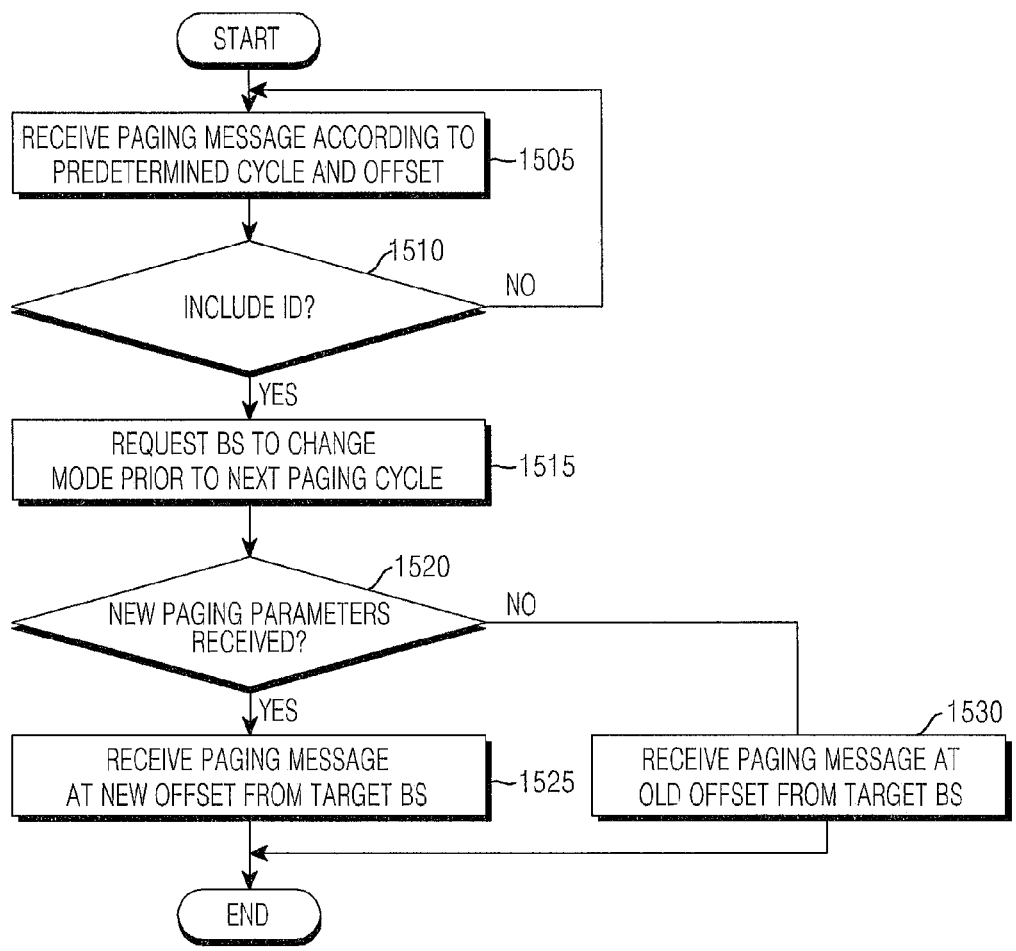
FIG. 15 illustrates a process of idle mode transition operations of a MS according to another embodiment of the present disclosure.

FIG. 15 illustrates a flowchart showing idle mode transition operations of a MS according to another embodiment of the present disclosure.

Referring to FIG. 15, the semi-idle mode MS receives a Paging_adv message according to given paging parameters, that is, a paging cycle and a paging offset in operation 1505. In operation 1510, the MS determines whether the received Paging_adv message includes its identification information. If the identification information of the MS is included in the received Paging_adv message, the MS determines that the MS is currently located in the semi-idle paging group and returns to operation 1505 to continue performing semi-idle mode operations.

Alternatively, if the received Paging_adv message includes the same PGID, but does not include the identification information of the SS, the MS sends the Mode_Req message for requesting change to the idle mode to a BS (hereinafter, referred to as a target BS) to which the MS is connectable in the current location, in operation 1515. In operation 1520, the MS determines whether a new paging parameter has been received from the target BS. If the new paging parameter has not been received, the MS periodically receives Paging_adv messages from the target BS and other BSs of the paging group according to the old paging parameters. If the new paging parameter has been received, the MS periodically receives the Paging_adv message from the target BS and other BSs of the paging group according to the new paging parameter in operation 1525.

Figure 16:
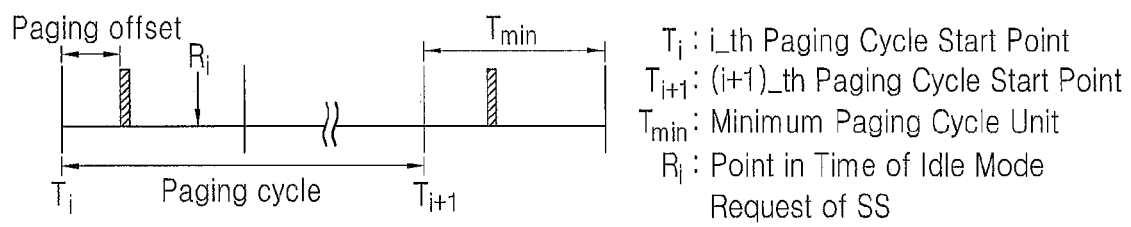
FIG. 16 illustrates an example of change of a paging cycle according to an embodiment of the present disclosure.

FIG. 16 illustrates an example of change of a paging cycle according to an embodiment of the present disclosure.

Referring to FIG. 16, an $i^{th}$ paging cycle has a time period from $T_i$ to $T_{i+1}$, and is a multiple of $T_{min}$ that means a minimum paging cycle unit. Herein, $T_{min}$ may be, for example, given as 4 subframes. If the MS requests change to the idle mode at a particular point-in-time in the $i^{th}$ paging cycle, paging parameters may be changed considering a time interval $R_i$ from the start point of the paging cycle to the point-in-time at which the MS requests change to the idle mode and a time interval $P_i$ from the point-in-time at which the MS requests change to the idle mode to a point-in-time at which Paging announce information is delivered to other BSs.

Figure 17:
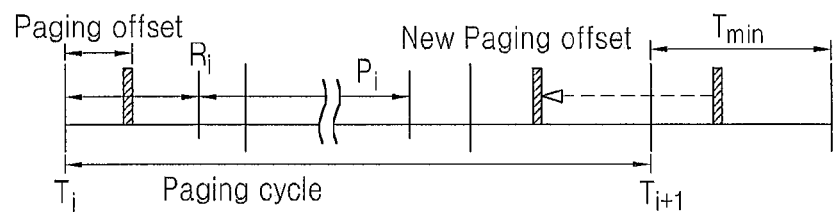
FIG. 17 illustrates another example of change of a paging cycle according to an embodiment of the present disclosure.

FIG. 17 illustrates another example of change of a paging cycle according to an embodiment of the present disclosure.

Referring to FIG. 17, an $i^{th}$ paging cycle has a time period from $T_i$ to $T_{i+1}$, and the MS requests mode change at a point-in-time $R_i$ following reception of a Paging_adv message according to the current paging offset. If change of the paging offset is needed, the MS should be able to receive the Paging_adv message at a point-in-time corresponding to the changed paging offset.

In an embodiment, after the BS having received the Mode_Req message from the MS determines whether to reduce the paging offset, the BS may notify the MS of whether to change the paging offset and/or the changed paging offset. In this embodiment, the MS waits instead of sleeping while turning on the communication circuit, until receiving a message indicating whether to change the paging offset from the BS after sending the Mode_Req message to the BS.

In another embodiment, the BS and the MS determine whether to change the paging offset by using the same algorithm, and if necessary, determine a new paging offset. That is, to change paging parameters, the time Pi taken for BSs that are not included in the semi-idle paging group to receive Paging announce information of the MS from the paging controller through a backhaul link needs to be considered, and Pi is calculated as a statistic average value and shared between the BSs and the SS. Thus, the MS may calculate a new paging offset without signaling of the BS.

In an embodiment, a condition for changing a paging offset based on the foregoing algorithm may be expressed as follows:

$$T - P_i - R_i > T_{min} \quad (1),$$

where T indicates a paging cycle ($T_{i+1} - T_i$). The BS and the MS determine to change the paging offset if Equation 1 is satisfied.

If the BS and the MS determine to change the paging offset, in an embodiment, the new paging offset may be calculated by:

$$\text{new paging offset} = \left( \text{paging offset} + T_{min} \times \left( \left\lceil \frac{R_i + P_i}{T_{min}} \right\rceil \right) \right) (\text{mod paging cycle}), \quad (2)$$

where mod means a modular operation.

The BS and the MS determine a new paging offset using the same equation. The BS sends a Paging_adv message for the MS according to the new paging offset. The MS starts receiving a Paging_adv message at a point-in-time corresponding to the new paging offset.

If the new paging offset is applied, as illustrated in FIG. 17, a point-in-time of reception of the Paging_adv message is advanced. Alternatively, if the condition for changing the paging offset (for example, Equation 1) is not satisfied, the Paging_adv message is transmitted and received according to the old paging offset as illustrated in FIG. 15.

In a selectable embodiment, the paging controller determines whether to change the paging offset based on Equation 1, determines the new paging offset based on Equation 2, and provides the new paging offset to the BSs and the SS.

Figure 18:
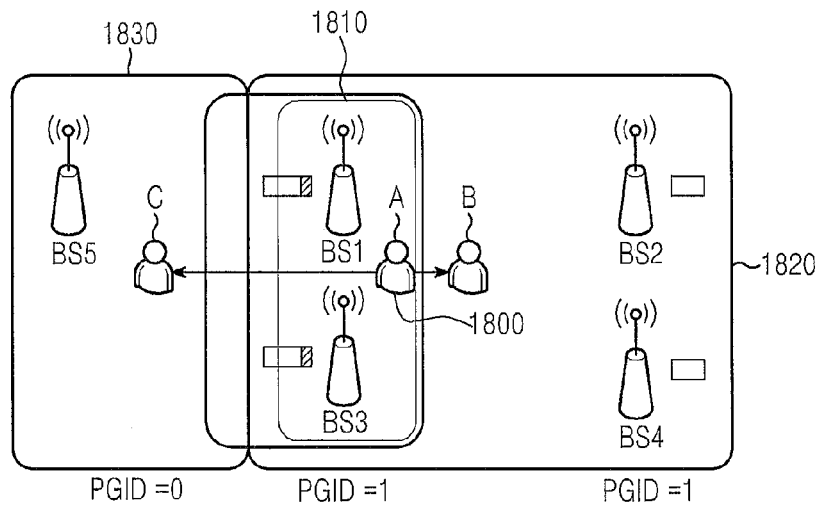
FIG. 18 illustrates an idle handover of a MS between paging groups according to an embodiment of the present disclosure.

FIG. 18 illustrates an idle handover of a MS between paging groups according to an embodiment of the present disclosure.

Referring to FIG. 18, a paging group 1820 may include BS1, BS2, BS3, and BS4, and a semi-idle paging group 1810, which is a subset of the paging group 1820, may include BS1 and BS3. BS1 to BS4, which belong to the same paging group 1820, has the same PGID=1. From a location A near BS1 that belongs to the semi-idle paging group 1810, a MS 1800 moves to a location B in the same paging group 1820 or a location C in another paging group 1830. If the MS 1800 moves to the location B, transition from the semi-idle mode to the idle mode occurs as descried above. Alternatively, if the MS 1800 moves to the location C, the MS 1800 fails to normally receive the Paging_adv message in a wake-up period of the old paging offset in which the MS waits for reception, because another paging offset is applied to the paging group 1830. In this embodiment, an idle handover occurs between typical paging groups.

Figure 19:
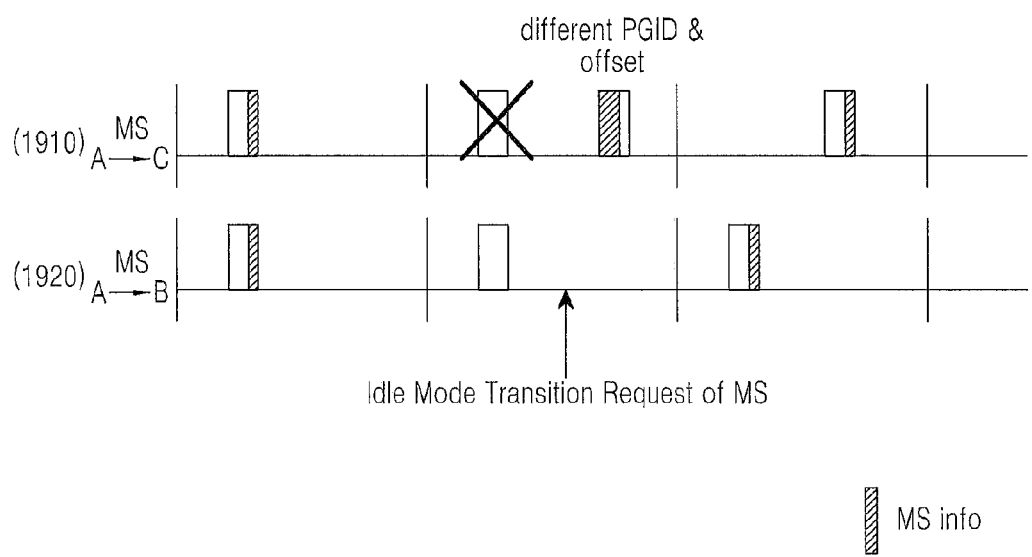
FIG. 19 illustrates a timeline for a paging operation based on movement of a MS between paging groups.

FIG. 19 illustrates a timeline for a paging operation based on movement of a MS between paging groups.

Referring to FIG. 19, a reference numeral 1920 indicates an embodiment where the MS 1800 moves from the location A to the location B, and a reference numeral 1910 indicates an embodiment where the MS 1800 moves from the location A to the location C. In the embodiment 1920, the MS 1800 sends a request for transition to the idle mode to a new BS of the same paging group according to one of the above-described embodiments. In the embodiment 1910, a PGID and a paging offset that are different from those applied to the old paging group are applied to the new paging group, such that the MS 1800 fails to receive the Paging_adv message at a point-in-time corresponding the old paging offset and thus performs an idle handover between paging groups.

Figure 20:
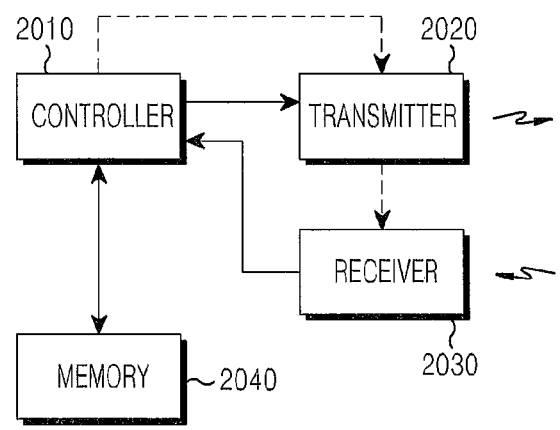
FIG. 20 illustrates a block diagram of a MS according to an embodiment of the present disclosure.

FIG. 20 illustrates a block diagram of a MS according to an embodiment of the present disclosure.

Referring to FIG. 20, the MS may include a controller 2010, a transmitter 2020, a receiver 2030, and a memory 2040. The controller 2010 determines to enter the semi-idle mode or the idle mode, sends the DREG_REQ message to the BS through the transmitter 2020, and receives the Paging_adv message according to given paging offset and paging cycle through the receiver 2030. The memory 2040 stores paging parameters necessary for a paging operation, provides them to the controller 2010 if necessary, and receives a new paging parameter from the controller 2010 for update.

Figure 21:
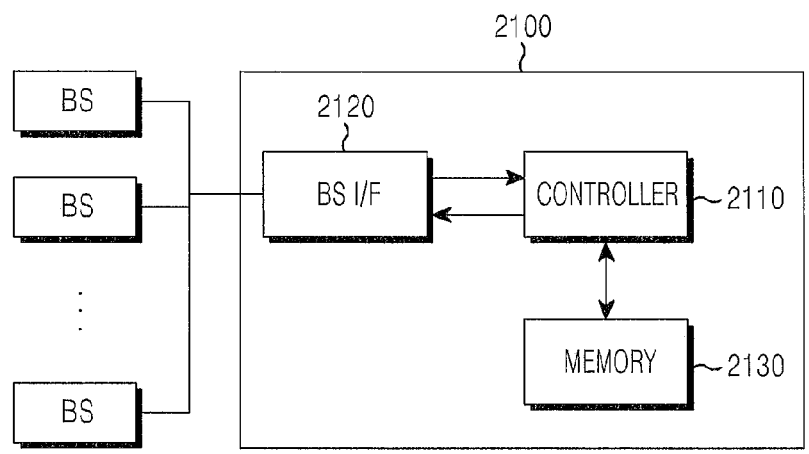
FIG. 21 illustrates a block diagram of a paging controller according to an embodiment of the present disclosure.

FIG. 21 illustrates a block diagram of a paging controller according to an embodiment of the present disclosure.

Referring to FIG. 21, the paging controller may include a BS Interface (I/F) unit 2120, a controller 2110, and a memory 2130. The BS I/F unit 2120 receives the DREG_REQ message, together with the ID of the SS, from at least one of BSs connected through a wired or wireless backhaul link, and delivers the received DREG_REQ message to the controller 2110. As receiving the DREG_REQ message, the controller 2110 determines whether the MS is to enter the semi-idle mode or the idle mode, and notifies the MS of the result through the BS I/F unit 2120. The controller 2110 generates Paging announce information of the MS for corresponding BSs according to the mode of the SS, and delivers the generated Paging announce information to the corresponding BSs through the BS I/F unit 2120.

According to the embodiments of the present disclosure, if the MS transits to the normal mode from the semi-idle mode due to data traffic, backhaul overhead (paging signaling and awake signaling) may be saved when compared to transition from the idle mode to the normal mode. Moreover, BSs that do not belong to the semi-idle paging group of the MS do not need to have paging parameters of the SS, thus reducing generation of the Paging_adv message in a wireless environment. Furthermore, when the semi-idle mode MS moves to another BS in the same paging group, the point-in-time of reception of the Paging_adv message may be advanced by changing the paging offset.

Other effects that may be obtained or expected from the embodiment of the present disclosure are explicitly or implicitly disclosed in the detailed description of the embodiment of the present disclosure. That is, various effects expected from the embodiment of the present disclosure have been disclosed in the detailed description of the present disclosure.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for operating an idle mode in a wireless communication system, the method comprising:
   receiving, by a paging controller from a mobile station (MS), a first message requesting entry to an idle mode through at least one base station (BS);
   determining whether the MS operates the idle mode corresponding to a paging group for the MS or a semi-idle mode corresponding to a semi-idle paging group, which is a subset of a paging group;
   transmitting, by the paging controller to first BSs belonging to the paging group, first paging announce information instructing that the first BSs transmit a paging message for the MS, if the idle mode is determined;
   identifying one or more second BSs participating in a cooperative communication for the MS as the semi-idle paging group; and
   transmitting, by the paging controller to the one or more second BSs participating in a cooperative communication for the MS, second paging announce information instructing that the one or more second BSs transmit a paging message for the MS, if the semi-idle mode is determined,
   wherein a new page parameter for transmitting the paging message is applied by the first BSs or the one or more second BSs if a change of a paging parameter is determined based on a first time interval from a point-in-time at which the MS requests change to the idle mode to the point-in-time at which paging announce information is delivered to the BSs that is not participating in the cooperative communication for the MS, and a second time interval from a start point of a paging cycle to the point-in-time at which the MS requests change to the idle mode.

2. The method of claim 1, wherein the determining comprise at least one of:
   selecting the semi-idle mode if a number of BSs having received the first message from the MS exceeds a predetermined reference value;
   selecting the semi-idle mode if the one or more second BSs participating in the cooperative communication of the MS comprise higher received signal strengths than those of BSs that are not participating in the cooperative communication of the MS; and
   selecting the semi-idle mode if a number of changes of the one or more BSs participating in the cooperative communication for the MS is less than a predetermined reference value within a predetermined time.

3. The method of claim 1, wherein the first message comprises a signal measurement result indicating received signal strengths for the one or more second BSs participating in the cooperative communication for the MS or received signal strengths for neighboring BSs located near the MS.

4. The method of claim 1, further comprising transmitting a second message indicating the semi-idle mode or the idle mode to the MS through the at least one BS.

5. The method of claim 1, further comprising:
   receiving, by the paging controller, a second message requesting entry to the idle mode from the MS in the semi-idle mode; and
   transmitting, by the paging controller, paging announce information to the first BSs belonging to the paging group in response to reception of the second message.

6. The method of claim 5, wherein the second message is transmitted from the MS when the MS senses that received signal strengths for the one or more second BSs belonging to the semi-idle paging group are less than a predetermined threshold value.

7. The method of claim 5, wherein the second message is transmitted from the MS when a paging message that does not comprise identification information of the MS is received.

8. The method of claim 5, further comprising:
   in response to reception of the second message, determining, by the paging controller, that change of a paging parameter for the MS is needed; and
   transmitting, by the paging controller, a third message comprising a new page parameter to the MS.

9. A method for operating an idle mode in a wireless communication system, the method comprising:
   transmitting, by a mobile station (MS) to a paging controller a first message requesting entry to an idle mode through at least one base station (BS);
   receiving, by the MS, a second message instructing one of the idle mode corresponding to a paging group for the MS and a semi-idle mode corresponding to a semi-idle paging group, which is a subset of the paging group, wherein the paging group comprises first BSs and the semi-idle paging group comprises one or more second BSs participating in a cooperative communication for the MS;
   determining whether transition to the idle mode is needed while operating in the semi-idle mode in response to reception of the second message instructing the semi-idle mode; and
   transmitting, by the MS, a third message requesting entry to the idle mode to the paging controller, if determining that transition to the idle mode is needed,
   wherein the first BSs belonging to the paging group transmit a paging message for the MS in the idle mode, in response to receiving a first paging announce information, from a paging controller, instructing that the first BSs transmit the paging message for the MS, and
   wherein the one or more second BSs participating in the cooperative communication for the MS transmit a paging message for the MS in the semi-idle mode, in response to receiving a second paging announce information, from the paging controller, instructing that the one or more second BSs transmit the paging message for the MS,
   wherein the MS determines to use a new page parameter for receiving the paging message if a change of a paging parameter is determined based on a first time interval from a point-in-time at which the MS requests change to the idle mode to the point-in-time at which paging announce information is delivered to the BSs that is not participating in the cooperative communication for the MS, and a second time interval from a start point of a paging cycle to the point-in-time at which the MS requests change to the idle mode.

10. The method of claim 9, wherein the second message instructs entry of the MS to the semi-idle mode, if at least one of:
   a condition that a number of BSs having received the first message from the MS exceeds a predetermined reference value, a condition that the one or more second BSs participating in the cooperative communication of the MS comprise higher received signal strengths than those of BSs that are not participating in the cooperative communication of the MS, and a condition that a number of changes of the one or more BSs participating in the cooperative communication for the MS is less than a predetermined reference value within a predetermined time is satisfied.

11. The method of claim 9, wherein the first message comprises a signal measurement result indicating received signal strengths for the one or more second BSs participating in the cooperative communication the MS or received signal strengths for neighboring BSs located near the MS.

12. The method of claim 9, wherein the determining comprises determining transition to the idle mode if sensing that received signal strengths for the BSs belonging to the semi-idle paging group are less than a predetermined threshold value.

13. The method of claim 9, wherein the determining comprises determining transition to the idle mode if receiving a paging message that does not comprise identification information of the MS.

14. The method of claim 9, wherein it is determined that the change of the paging parameter is needed if an equation provided below is satisfied:

$$T - P_i - R_i > T_{min},$$

wherein T indicates a paging cycle, $P_i$ indicates the first time interval from a point-in-time at which the MS requests change to the idle mode to the point-in-time at which Paging announce information is delivered to the BSs that are not participating in the cooperative communication for the MS, $R_i$ indicates the second time interval from a start point of a paging cycle to the point-in-time at which the MS requests change to the idle mode, and $T_{min}$ means a minimum paging cycle unit.

15. The method of claim 14, wherein the new paging parameter comprises a new paging offset calculated by:

$$\text{new paging offset} = \left(\text{paging offset} + T_{min} \times \left(\left\lceil \frac{R_i + P_i}{T_{min}} \right\rceil\right)\right)(\text{mod paging cycle}).$$

16. An apparatus in a paging controller for controlling an idle-mode operation of a mobile station (MS) in a wireless communication system, the apparatus comprising:

a transceiver configured to receive, form the MS, a first message requesting entry to an idle mode through at least one base station (BS); and a controller configured to determine whether the MS operates the idle mode corresponding to a paging group for the MS or a semi-idle mode corresponding to a semi-idle paging group, which is a subset of a paging group, and identify one or more second BSs participating in a cooperative communication for the MS as the semi-idle paging group;

wherein the transceiver is further configured to transmit, to first BSs belonging to the paging group, first paging announce information instructing that the first BSs transmit a paging message for the MS, if the idle mode is determined, and transmit, to the one or more second BSs participating in a cooperative communication for the MS, second paging announce information instructing that the one or more BSs transmit a paging message for the MS, if the semi-idle mode is determined, wherein a new page parameter for transmitting the paging message is applied by the first BSs or the one or more second BSs if a change of a paging parameter is determined based on a first time interval from a point-in-time at which the MS requests change to the idle mode to the point-in-time at which paging announce information is delivered to the BSs that is not participating in the cooperative communication for the MS, and a second time interval from a start point of a paging cycle to the point-in-time at which the MS requests change to the idle mode.

17. The apparatus of claim 16, wherein the controller performs at least one of:

an operation of selecting the semi-idle mode if a number of BSs having received the first message from the MS exceeds a predetermined reference value;

an operation of selecting the semi-idle mode if the one or more second BSs participating in the cooperative communication of the MS comprise higher received signal strengths than those of BSs that are not participating in the cooperative communication for the MS; and an operation of selecting the semi-idle mode if a number of changes of the one or more BSs participating in the cooperative communication for the MS is less than a predetermined reference value within a predetermined time.

18. The apparatus of claim 16, wherein the first message comprises a signal measurement result indicating received signal strengths for the one or more second BSs participating in the cooperative communication for the MS or received signal strengths for neighboring BSs located near the MS.

19. The apparatus of claim 16, wherein the transceiver is further configured to transmit a second message indicating the semi-idle mode or the idle mode to the MS through the at least one BS.

20. The apparatus of claim 16, wherein, in response to reception of a second message requesting entry to the idle mode from the MS in the semi-idle mode, the transceiver is further configured to transmit paging announce information to the first BSs belonging to the paging group in response to reception of the second message.

21. The apparatus of claim 20, wherein the second message is transmitted from the MS when the MS senses that received signal strengths for the one or more second BSs belonging to the semi-idle paging group are less than a predetermined threshold value.

22. The apparatus of claim 20, wherein the second message is transmitted from the MS when a paging message that does not comprise identification information of the MS is received.

23. The apparatus of claim 20, wherein when determining that change of a paging parameter for the MS is needed, in response to reception of the second message, the transceiver is further configured to transmit a third message comprising a new page parameter to the MS.

24. An apparatus of a mobile station (MS) for operating in an idle mode in a wireless communication system, the MS comprising:

a transceiver configured to transmit, to a paging controller, a first message requesting entry to an idle mode through at least one Base Station (BS) and receive, in response to the first message, a second message instructing one of the idle mode corresponding to a paging group for the MS and a semi-idle mode corresponding to a semi-idle paging group, which is a subset of the paging group, wherein the paging group comprises first BSs and the semi-idle paging group comprises one or more second BSs participating in a cooperative communication for the MS; and a controller configured to determine whether transition to the idle mode is needed while operating in the semi-idle mode in response to reception of the second message instructing the semi-idle mode, and to control the transceiver to transmit a third message requesting entry to the idle mode to the paging controller, if determining that transition to the idle mode is needed, wherein the first BSs belonging to the paging group transmit a paging message for the MS in the idle mode, in response to receiving a first paging announce information, from a paging controller, instructing that the first BSs transmit the paging message for the MS, and wherein the one or more second BSs participating in the cooperative communication for the MS transmit a paging message for the MS in the semi-idle mode, in response to receiving a second paging announce information, from the paging controller, instructing that the one or more second BSs transmit the paging message for the MS, wherein the controller is further configured to determine to use a new page parameter for receiving the paging message if a change of a paging parameter is determined based on a first time interval from a point-in-time at which the MS requests change to the idle mode to the point-in-time at which paging announce information is delivered to the BSs that is not participating in the cooperative communication for the MS, and a second time interval from a start point of a paging cycle to the point-in-time at which the MS requests change to the idle mode.

25. The apparatus of claim 24, wherein the second message instructs entry of the MS to the semi-idle mode, if at least one of:

a condition that a number of BSs having received the first message from the MS exceeds a predetermined reference value, a condition that the one or more second BSs participating in the cooperative communication of the MS comprise higher received signal strengths than those of BSs that are not participating in the cooperative communication of the MS, and a condition that a number of changes of the one or more BSs participating in the cooperative communication for the MS is less than a predetermined reference value within a predetermined time is satisfied.

26. The apparatus of claim 24, wherein the first message comprises a signal measurement result indicating received signal strengths for the one or more second BSs participating in the cooperative communication for the MS or received signal strengths for neighboring BSs located near the MS.

27. The apparatus of claim 24, wherein the controller determines transition to the idle mode if sensing that received signal strengths for the BSs belonging to the semi-idle paging group are less than a predetermined threshold value.

28. The apparatus of claim 24, wherein the controller determines transition to the idle mode if a paging message that does not comprise identification information of the MS is received.

29. The apparatus of claim 24, wherein the controller determines that the change of the paging parameter is needed if an equation provided below is satisfied:

$$T - P_i - R_i > T_{min},$$

wherein T indicates a paging cycle, $P_i$ indicates the first time interval from a point-in-time at which the MS requests change to the idle mode to the point-in-time at which Paging announce information is delivered to the BSs that are not participating in the cooperative communication for the MS, $R_i$ indicates the second time interval from a start point of a paging cycle to the point-in-time at which the MS requests change to the idle mode, and $T_{min}$ means a minimum paging cycle unit.

30. The apparatus of claim 29, wherein the new paging parameter comprises a new paging offset calculated by:

$$\text{new paging offset} = \left(\text{paging offset} + T_{min} \times \left(\left\lceil \frac{R_i + P_i}{T_{min}} \right\rceil\right)\right) (\text{mod paging cycle}).$$

* * * * *